(12) United States Patent
Novel et al.

(10) Patent No.: US 12,299,815 B2
(45) Date of Patent: May 13, 2025

(54) SYSTEMS, METHODS, AND MEDIA FOR FILTERING POINTS OF A POINT CLOUD UTILIZING VISIBILITY FACTORS TO GENERATE A MODEL OF A SCENE

(71) Applicant: Bentley Systems, Incorporated, Exton, PA (US)

(72) Inventors: Cyril Novel, Paris (FR); Jean-Philippe Pons, Le Rouret (FR); Luc Robert, Valbonne (FR)

(73) Assignee: Bentley Systems, Incorporated, Exton, PA (US)

( * ) Notice: Subject to any disclaimer, the term of this patent is extended or adjusted under 35 U.S.C. 154(b) by 141 days.

(21) Appl. No.: 17/982,798

(22) Filed: Nov. 8, 2022

(65) Prior Publication Data

US 2024/0153207 A1 May 9, 2024

(51) Int. Cl.
*G06T 17/00* (2006.01)
*G06T 15/06* (2011.01)
*G06T 19/20* (2011.01)

(52) U.S. Cl.
CPC ............ *G06T 17/005* (2013.01); *G06T 15/06* (2013.01); *G06T 19/20* (2013.01); *G06T 2210/12* (2013.01); *G06T 2210/21* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 2019/0101649 A1* | 4/2019 | Jensen | G05D 1/024 |
| 2020/0357171 A1* | 11/2020 | Godzaridis | G06T 7/11 |
| 2021/0157001 A1 | 5/2021 | Novel et al. | |
| 2022/0260692 A1* | 8/2022 | Morelli | G01S 7/497 |
| 2023/0194715 A1* | 6/2023 | Elogeel | G06T 7/246 |
| | | | 356/4.01 |

OTHER PUBLICATIONS

International Search Report and Written Opinion mailed Feb. 26, 2024 for International Patent Application No. PCT/US2023/036763 filed Nov. 3, 2023 for Bentley Systems, Incorporated, 15 pages.

(Continued)

*Primary Examiner* — Andrew G Yang
(74) *Attorney, Agent, or Firm* — Cesari and McKenna, LLP (57) ABSTRACT

A sample may be generated for each point of a plurality of point clouds that represent a scene. A visibility ray may be created between each point of the plurality of point clouds and the one or more sources that generated the point. One or more sample, if any, that intersect a visibility ray may be identified. Each point corresponding to an intersecting sample may be determined to represent or likely represent an unwanted object if the visibility ray is from a different source that did not generate the point and the point is not coherent with any points generated by the different source. A visibility score for each point determined to represent or likely represent an unwanted object may be adjusted. A model may be generated, wherein the model does not include the unwanted object in the scene but includes the permanent object with see-through characteristics in the scene.

21 Claims, 8 Drawing Sheets

(56) References Cited

OTHER PUBLICATIONS

Schauer Johannes et al., "Removing non-static objects from 3D laser scan data" ISPRS Journal of Photogrammetry and Remote Sensing, Amsterdam, NL, vol. 143, Jun. 19, 2018, pp. 15-38.
W. Xiao et al., "Change Detection in 3D Point Clouds Acquired by a Mobile Mapping System," ISPRS Annals of Photogrammetry, Remote Sensing and Spatial Information Sciences, vol. II-5/W2, Oct. 16, 2013, pp. 331-336.

* cited by examiner

SYSTEMS, METHODS, AND MEDIA FOR FILTERING POINTS OF A POINT CLOUD UTILIZING VISIBILITY FACTORS TO GENERATE A MODEL OF A SCENE

BACKGROUND

Technical Field

The present disclosure relates generally to processing point clouds, and more specifically to filtering points of a point cloud utilizing visibility factors to generate a model of a scene.

Background Information

In the design, construction and/or operation of infrastructure (e.g., buildings, factories, roads, railways, bridges, electrical and communication networks, equipment, etc.) it is often desirable to create models, e.g., three-dimensional (3D) high-resolution models, of a scene in which the infrastructure is built, or planned to be built.

Particular applications, e.g., the ContextCapture™ application available from Bentley Systems, Inc., may automatically generate a high-resolution 3D mesh (e.g., 3D model) of a scene from a point cloud. The point cloud can be captured by a scanner, e.g., Light Detection and Ranging (LiDAR) scanner, that may be static or mobile. In addition or alternatively, the point cloud can be generated from images, e.g., ordinary photographs, captured by cameras.

In certain instances, there may be a temporary or unwanted object located in the scene when the scene is captured by the scanner or the cameras. For example, a person may be walking through the scene, a car may be driving through the scene, or a car may be parked in the scene when the scene is captured. As such, the point cloud would include the points that represent the surfaces of the permanent, i.e., wanted, objects in the scene, as well as the points that represent the surfaces of the temporary or unwanted objects (hereinafter "unwanted objects") in the scene. Because the objects are unwanted, it may be desirable to remove the points representing these objects from the point cloud such that the 3D model generated for the scene does not include the unwanted objects.

Additionally, certain permanent objects in a scene may have see-through characteristics. A tree with leaves and a wired fence are just two of many different exemplary permanent objects in a scene that may have see-through characteristics. The points representing the object with see-through characteristics may not be as densely populated as the points representing an object, e.g., building, without see-through characteristics. For example, the points representing a wired fence would include a series of points at locations where the wires are located, while there would be no points at the locations where the holes in the wired fence are located. As such, the points representing the wired fence would be more sparsely distributed than the points representing an object, e.g., building, without see-through characteristics.

With certain conventional filtering techniques, the see-through characteristics of the object may cause the conventional filtering technique to classify one or more points representing the wires as outlier points. Specifically, the lack of points in the point cloud at the locations where the holes in the wired fence are located can cause the conventional filtering technique to determine that one or more points that represent the wires are outlier points, and thus should be removed from the point cloud. As a result, the 3D model that is generated for the scene may include a destroyed wired fence. By destroyed, it is meant that the wired fence in the 3D model is not accurately depicted because one or more portions of the wired fence are missing due to the conventional filtering technique.

Therefore, what is needed is a filtering technique that removes points from a point cloud representing unwanted objects while maintaining points in the point cloud that represent objects with see-through characteristics.

SUMMARY

Techniques are provided for filtering points of a point cloud utilizing visibility factors to generate a model of a scene. Specifically, the filtering may invalidate points of a point cloud that are determined to represent unwanted objects, while also maintaining in the point cloud those points that represent permanent objects with see-through characteristics. As such, a model of a scene can be generated, wherein the model does not include visual representations of the unwanted objects but does include visual representations of the permanent objects with see-through characteristics.

In an embodiment, a processor, e.g., a visibility module executed by the processor, may perform the filtering technique for each point of a plurality of point clouds. The points of a point cloud may represent the surfaces of one or more objects in a scene. In an implementation, the scene may include an unwanted object and/or a permanent object with see-through characteristics. Each point in a point cloud may be represented by particular information (e.g., a location, a scale, an oriented normal, a list of origins, and a visibility score). In an implementation, the visibility score for a point may be based on a number of sources that generated the point. For example, if a scanner captured the point, the visibility score may be 1. However, if a plurality of cameras generated the point, the visibility score may be equal to the number of cameras.

In an implementation, the processor may generate a sample for each point of the plurality of point clouds. The sample for a point may be generated utilizing the scale of the point and the oriented normal for the point. The processor may generate a coherent source set for each point, where the coherent source set includes a list of sources that should not be utilized to invalidate the point. The coherent source set for each point may always include the one or more sources that generated the point. Additionally, the coherent source set for each point may include a different source that generated a different point cloud. The different source may be included in the coherent source set for a point if a different point, generated by the different source, is consistent/coherent with the point.

In an implementation, a point is consistent/coherent with a different point if the different point is sufficiently close, i.e., within a threshold distance, to the point. In an embodiment, the different point is sufficiently close to the point when the sample created for the point includes the different point. Stated another way, the different point is sufficiently close to the point and within a threshold distance of the point when the center of the sample created for the different point is within the sample created for the point. If the different point is sufficiently close to the point, it can be determined that the point and the different point represent or likely represent the surface of the same object. If the point and the different point represent or likely represent the surface of the same object, the processor determines that the visibility rays of the scanner that generated the different point should not invalidate the point.

The processor may create, for each point of the plurality of point clouds, a visibility ray between the sample corresponding to the point and each source that generated the point. The processor may identify one or more samples, if any, that intersect each visibility ray. Each point corresponding to an intersecting sample may be determined to represent or likely represent an unwanted object if the visibility ray is from a different source that did not generate the point. Specifically, the processor may determine that the point represents or likely represents an unwanted object when (1) the visibility ray from the different source intersects the sample corresponding to the point at one or more locations determined to be behind a center of the intersecting sample, and (2) the point is not coherent with any points generated by the different source.

In an implementation, the processor may adjust, e.g., lower, the visibility score of each point determined to represent or likely represent an unwanted object. In an implementation, the visibility score may be lowered by a particular value. For example, the visibility score may be lowered by 0.33.

In an embodiment, the processor, e.g., a model generator module executed by the processor, may generate a model of a scene utilizing the point cloud and the visibility scores of each of the points of the point cloud. In an embodiment, the processor may utilize a model generation algorithm, e.g., floating scale surface reconstruction (FSSR) algorithm, with the point cloud and visibility scores to generate the model of the scene. Advantageously, the generated model does not include visual representations of unwanted objects but does include accurate visual representations of permanent objects with see-through characteristics.

Therefore, the one or more embodiments described herein generate a computer model (3D model) of a scene that is more accurate when compared to conventional techniques that may incorrectly filter out permanent objects with see-through characteristics. Accordingly, the one or more embodiments described herein provide an improvement in the existing technological fields of computer model generation and point cloud processing.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
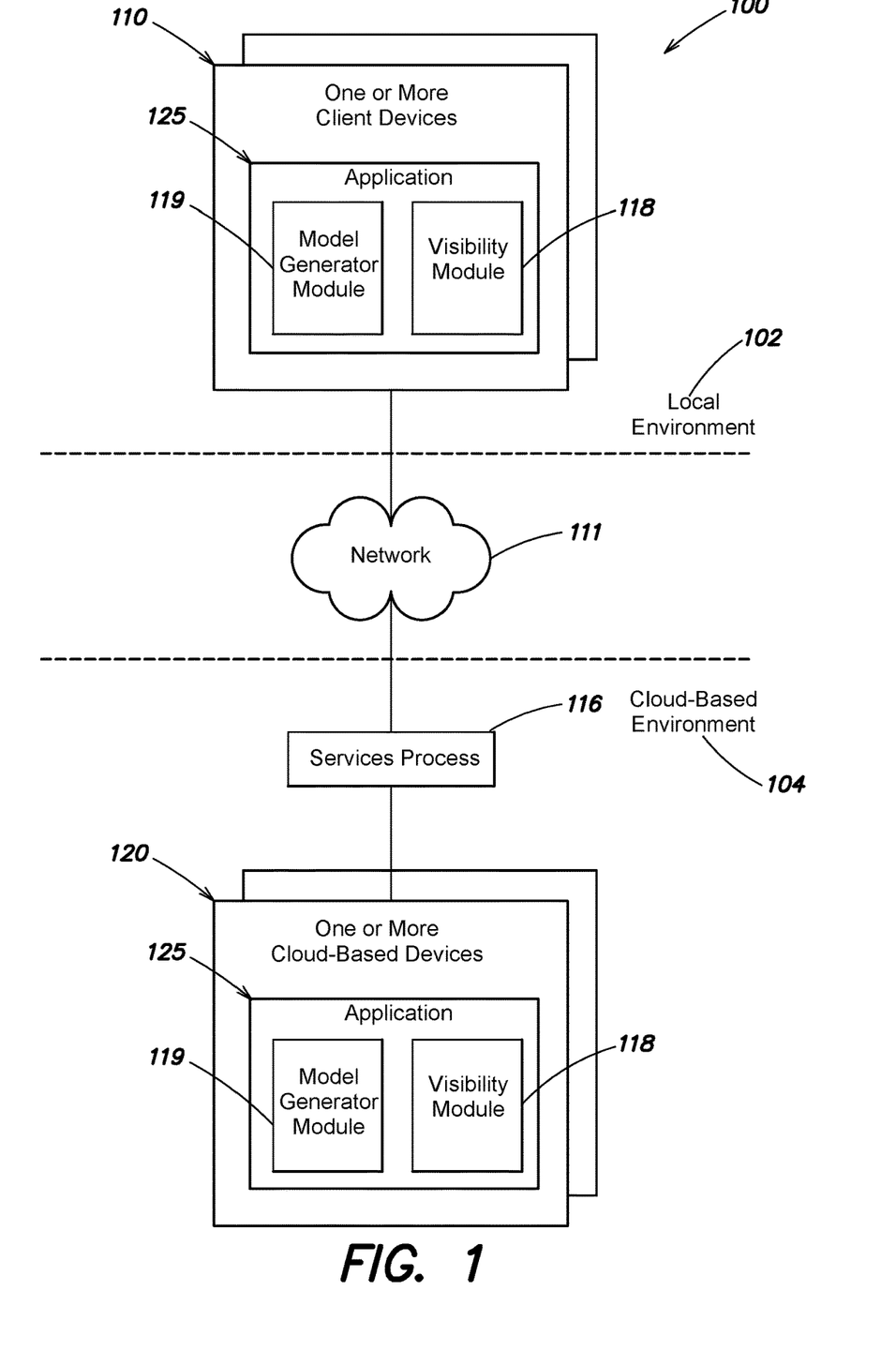
FIG. 1 is a high-level block diagram of an example architecture for filtering points of a point cloud utilizing visibility factors to generate a model of a scene according to one or more embodiments described herein.

FIG. 1 is a high-level block diagram of an example architecture 100 for filtering points of a point cloud utilizing visibility factors to generate a model of a scene according to one or more embodiments described herein. The architecture 100 may be divided into a local environment 102 that includes one or more local client devices 110 that are local to an end-user, and a cloud-based environment 104 that includes one or more cloud-based client devices 120 that are remote from the end-user and that are accessible to the end-user via a network 111 (e.g., the Internet). Each computing device, e.g., one or more local client devices 110 and one or more cloud-based client devices 120, may include processors, memory/storage, a display screen, and other hardware (not shown) for executing software/modules, storing data, and/or displaying information.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. A services process 116 may coordinate operation of the one or more local client devices 110 and the one or more cloud-based client devices 120 such that, for example, the one or more local client devices 110 may communicate with and access the one or more cloud-based client devices 120 via network 111.

The one or more client devices 110 and/or one or more cloud-based client devices 120 may store and execute application 125 that may filter points of a point cloud utilizing visibility factors according to the one or more embodiments as described herein.

In an embodiment, the application 125 may be imaging and/or modeling software that includes a modeling/simulation environment that may generate a model of a scene including one or more physical structures and simulate a behavior of the physical structures. For example, the modeling software may be the ContextCapture™ application available from Bentley Systems, Inc., which processes point clouds to generate high-resolution 3D models (e.g., a 3D mesh) of a scene. In an alternative embodiment, the application 125 may be any other application that processes a point cloud to generate a model of a scene. In an implementation, the 3D model may be referred to as a surface reconstruction of the scene. As used herein, the term "scene" may refer to a portion of a physical environment. A scene may include infrastructure (e.g., buildings, factories, roads, railways, bridges, electrical and communication networks, equipment, etc.), terrain (e.g., earth, rock, water, etc.), and/or other physical features and objects.

In an implementation, the one or more local client devices 110 may download and store application 125 according to the one or more embodiments described herein. In an implementation, the one or more local client devices 110 may utilize one or more user interfaces to access, via services process 116, the application 125 that is stored on the one or more cloud-based client devices 120 according to the one or more embodiments described herein.

The application 125 may include a visibility module 118 and a model generator module 119. In an embodiment, and as will be described in further detail below, the visibility module 118 may filter each point of a point cloud utilizing visibility factors. In an implementation, the visibility factors may include, but are not limited to, coherent source information associated with each point in the point cloud and visibility rays from each source, e.g., scanner, to each point generated by the source. In an implementation and as described in further detail below, the filtering may include utilizing the visibility factors to invalidate points that represent or likely represent unwanted objects in the scene.

In an embodiment, invalidating a point includes adjusting (e.g., lowering) a visibility value, i.e., visibility score, for the point. In an implementation, the visibility score may be a value between and including a lower limit value (e.g., 0) and an upper limit value (e.g., 1, 2, 3, etc.). In an implementation, a visibility score at the upper limit indicates that (1) the point represents a surface of a permanent object in the scene and (2) the point should be utilized in generating the model of the scene. A visibility score at the lower limit indicates that (1) the point represents a surface of an unwanted object in the scene and (2) the point should not be utilized in generating the model of the scene.

As such, the confidence that a point represents or likely represents a permanent object in the scene decreases as the visibility score decreases. Similarly, the confidence that a point represents or likely represents a permanent object in the scene increases as the visibility score increases. Further, there is a greater likelihood that a point represents or likely represents an unwanted object as the visibility score for the point decreases.

The model generator module 119 may utilize the point cloud and a visibility value, e.g., visibility score, determined for each point of a point cloud to generate a model of a scene. Specifically, the model may be generated such that visual representation of unwanted objects are not included in the model and visual representations of permanent objects, even those with see-through characteristics, are included and accurately depicted in the model.

Although FIG. 1 depicts visibility module 118 and model generator module 119 being separate entities of application 125, it is expressly contemplated that the functionalities of modifier module 118 and model generator module 119 may be performed by a single entity/process according to the one or more embodiments described herein. Additionally, it is expressly contemplated that each of the visibility module 118, and model generator module 119 may be hardware, software, or a combination thereof. In an embodiment, the processor (not shown) of a local client device 110 may be coupled to the memory (not shown) of the local client device 110, wherein the processor is configured to execute the visibility module 118 and/or the model generator module 119. In addition or alternatively, the processor (not shown) of a cloud-based client device 120 may be coupled to the memory (not shown) of the cloud-based client device 120, wherein the processor is configured to execute the visibility module 118 and/or the model generator module 119.

Figure 2:
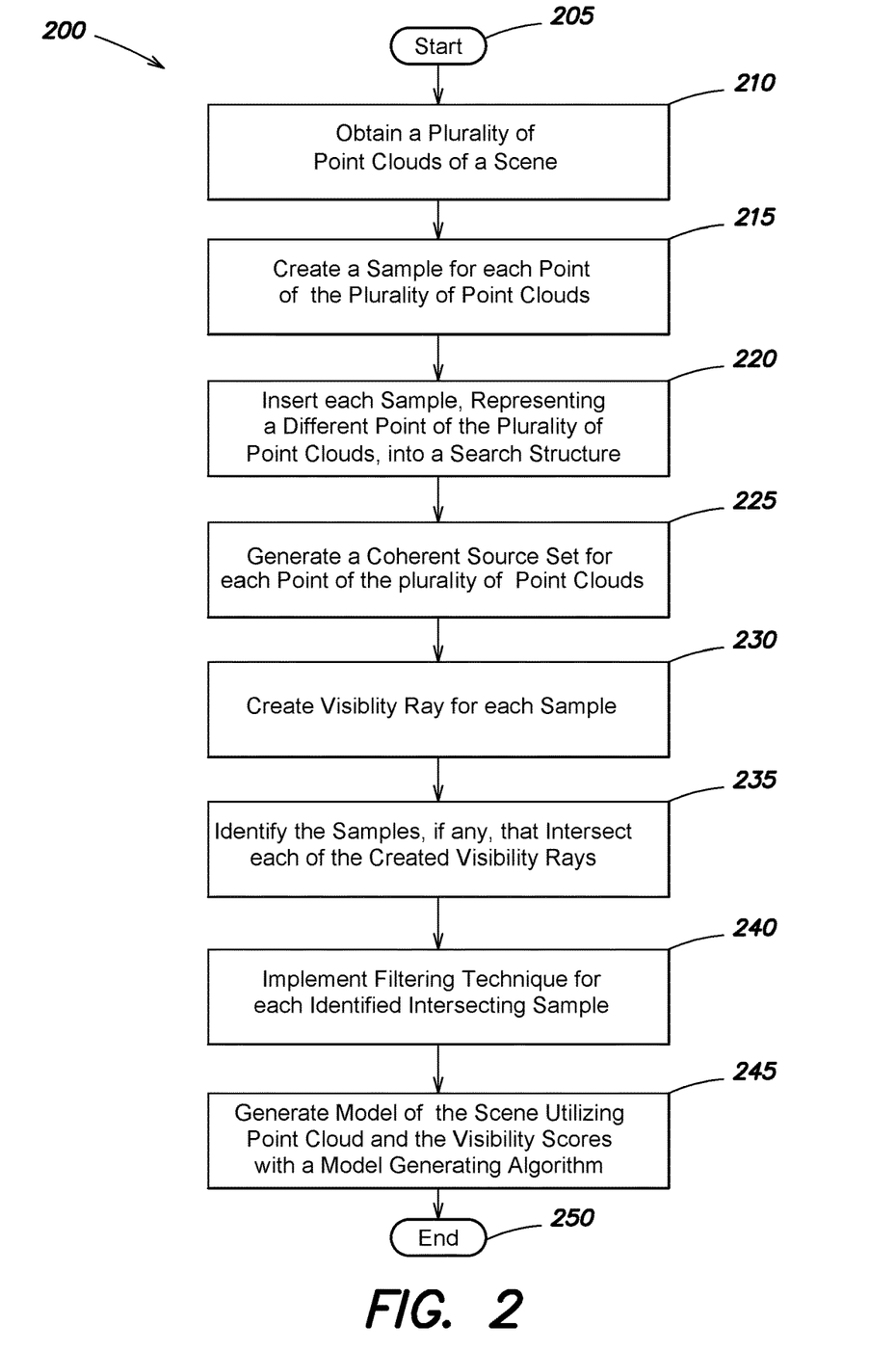
FIG. 2 is a flow diagram of a sequence of steps for filtering points of a point cloud utilizing visibility factors to generate a model of a scene according to one or more embodiments described herein.

FIG. 2 is a flow diagram of a sequence of steps for filtering points of a point cloud utilizing visibility factors to generate a model of a scene according to one or more embodiments described herein. Although FIG. 2 depicts a series of steps that are performed in a particular order, it is expressly contemplated that the steps of FIG. 2 may be performed in any of a variety of different orders. Additionally, it is expressly contemplated that multiple steps of FIG. 2 may be performed simultaneously. Further, and in implementation, each of the step of FIG. 2 may be performed in parallel or serially for each of the points of the point clouds and/or for each created sample.

Further, although the examples of FIGS. 2-7 may refer to point clouds each of which is captured by a different scanner, it is expressly contemplated that the one or more embodiments described herein are applicable to point clouds generated by other devices, such as, a plurality of cameras, e.g., at least two cameras. For example, a point cloud can be generated from at least two images (not shown) captured by at least two cameras (not shown) at different locations. Because an image is two-dimensional, at least two images of the scene from different vantage points are required to determine the 3D position (e.g., x, y, and z coordinates) in space of each point of the point cloud. Therefore, although the examples of FIGS. 2-7 may refer to a single source, e.g., a single LiDAR scanner, for a captured point cloud, it is expressly contemplated that the source may in fact be multiple cameras that generate a point cloud or one or more other devices that capture/generate a point cloud. Accordingly, the reference to a single scanner that captures a point cloud as described herein is for illustrative purposes only.

As will be described in further detail below, the visibility module 118 may utilize coherent source information and visibility rays to filter points of a point cloud. By filtering the points, the visibility module 118 can (1) determine which points represent or likely represent unwanted objects and can thus be invalidated, and (2) determine which points represent or likely represent permanent objects, e.g., a permanent object with see-through characteristics, and should thus be maintained in the point cloud. In an implementation, the visibility module 118 may lower a visibility score for a point determined to represent or likely represent an unwanted object. The model generator module 119 may utilize the visibility scores for the points of a point cloud with an algorithm, e.g., floating scale surface reconstruction (FSSR) algorithm, to generate a model of a scene that does not include visual representations of unwanted objects but includes visual representations of permanent objects, even those with see-through characteristics.

The procedure 200 starts at step 205 and continues to step 210 where the application 125 obtains a plurality of point clouds of a scene. Each point cloud may include information (e.g., a location, a scale, an oriented normal, a list of origins, and a visibility score) for each point in the point cloud. As will be described in further detail below for the filtering according to the one or more embodiments described herein, points of a point cloud that are captured by a source can be invalidated utilizing visibility rays from a different source. As such, at least two point clouds may be required to implement the filtering according to the one or more embodiments described herein. Additionally, the accuracy of the filtering may increase as the number of point clouds/sources utilized increases.

Figure 3A:
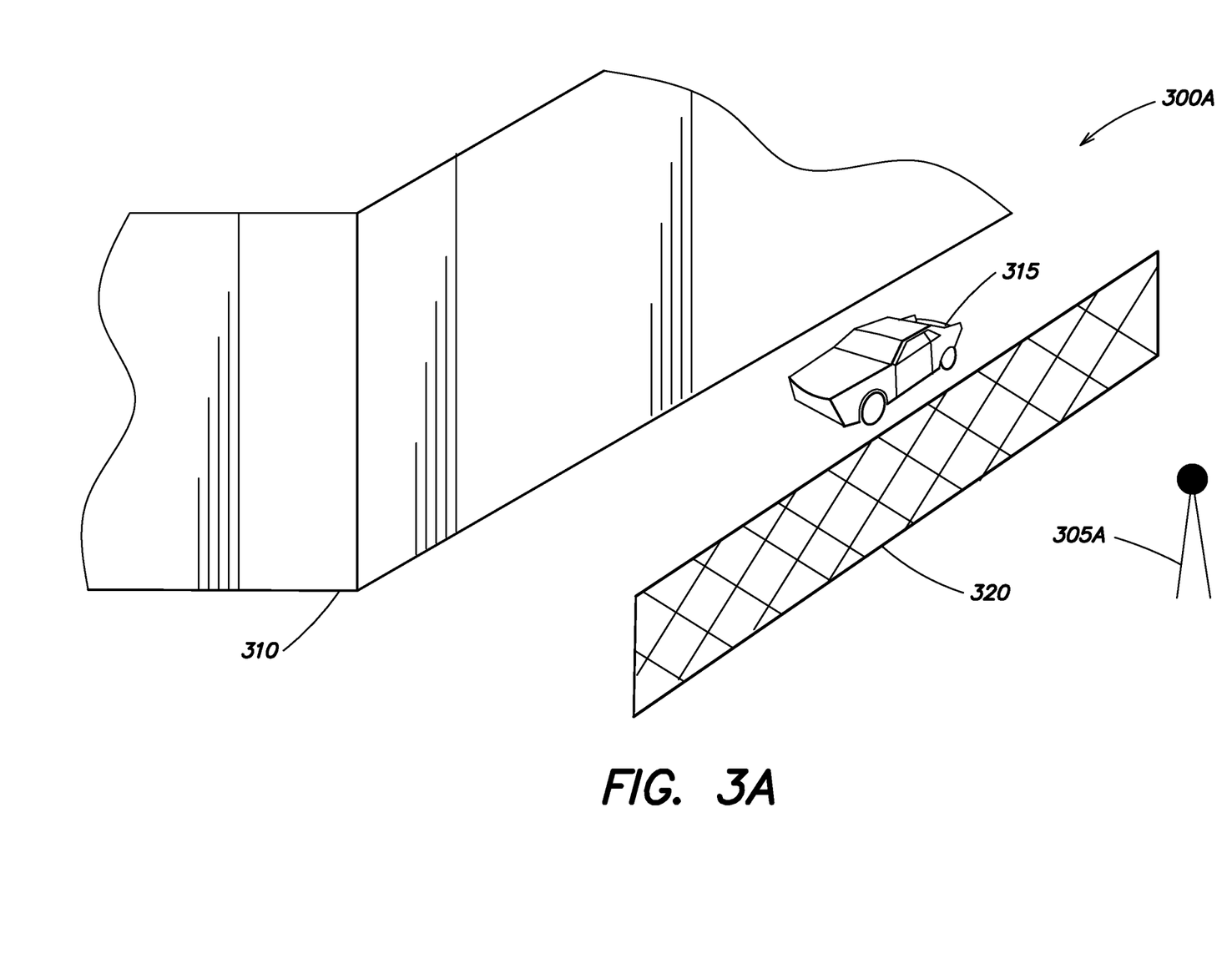
FIG. 3A is a diagram illustrating an example scene in which a scanner is located and operating according to the one or more embodiments described herein.

FIG. 3A is a diagram illustrating an example scene 300A in which a scanner 305A is located and operating according to the one or more embodiments described herein. Scanner 305A may operate in scene 300A that, for example, includes a plurality of objects. In the example of FIG. 3A, scene 300A includes a building 310, vehicle 315, and wired fence 320. Scanner 305A may be a LiDAR scanner that rotates and captures a point cloud that includes a plurality of points, e.g., 3D points, in space representing the external surfaces of the objects, e.g., building 310, vehicle 315, and wired fence 320, in scene 300A.

Figure 3B:
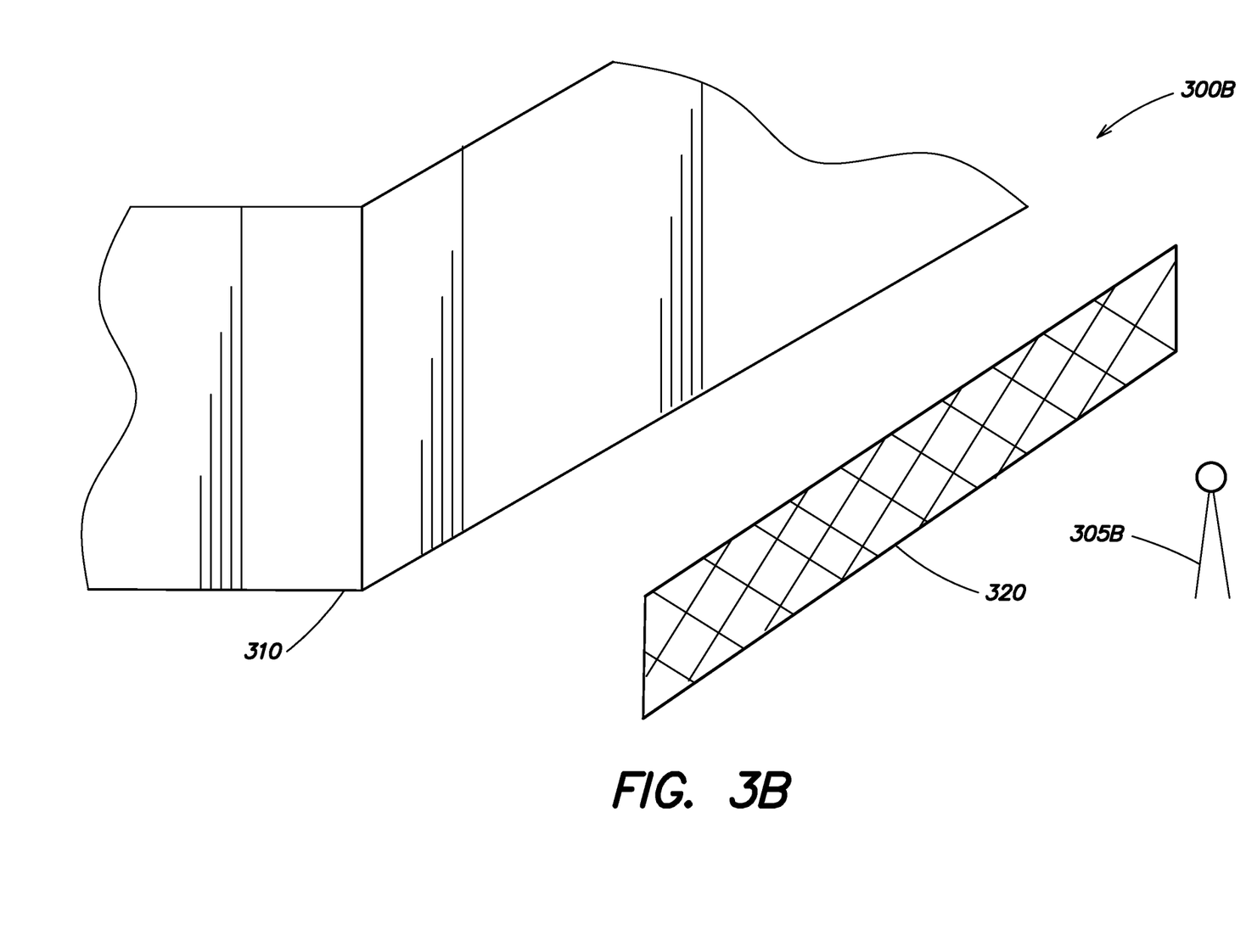
FIG. 3B is a diagram illustrating an example scene in which a different scanner is located and operating according to the one or more embodiments described herein.

FIG. 3B is a diagram illustrating an example scene 300B in which scanner 305B is located and operating according to the one or more embodiments described herein. Scene 305B overlaps with scene 305A such that one or more common objects, e.g., portions of building 310 and wired fence 320, are in both scenes 305B and scene 305A. As will be described in further detail below, the visibility module 118 can filter points that are located in the overlapping portion of scenes 305A and 305B according to the one or more embodiments described herein.

As depicted in FIG. 3B, scanner 305B is located at a different position than scanner 305A in FIG. 3A. Therefore, scanner 305B in FIG. 3B has a different vantage point of the building 310 and wired fence 320. Additionally, the vehicle 310 has moved and is not in scene 300B when scanner 305B captures the point cloud. As such, the point cloud captured by scanner 305B includes a plurality of points in space representing the external surfaces of the building 310 and the wired fence 320 in scene 300B. As described herein, building 310 is a permanent object, vehicle 315 is an unwanted, e.g., moving, object, and wired fence 320 is a permanent object with see-through characteristics.

Figure 4:
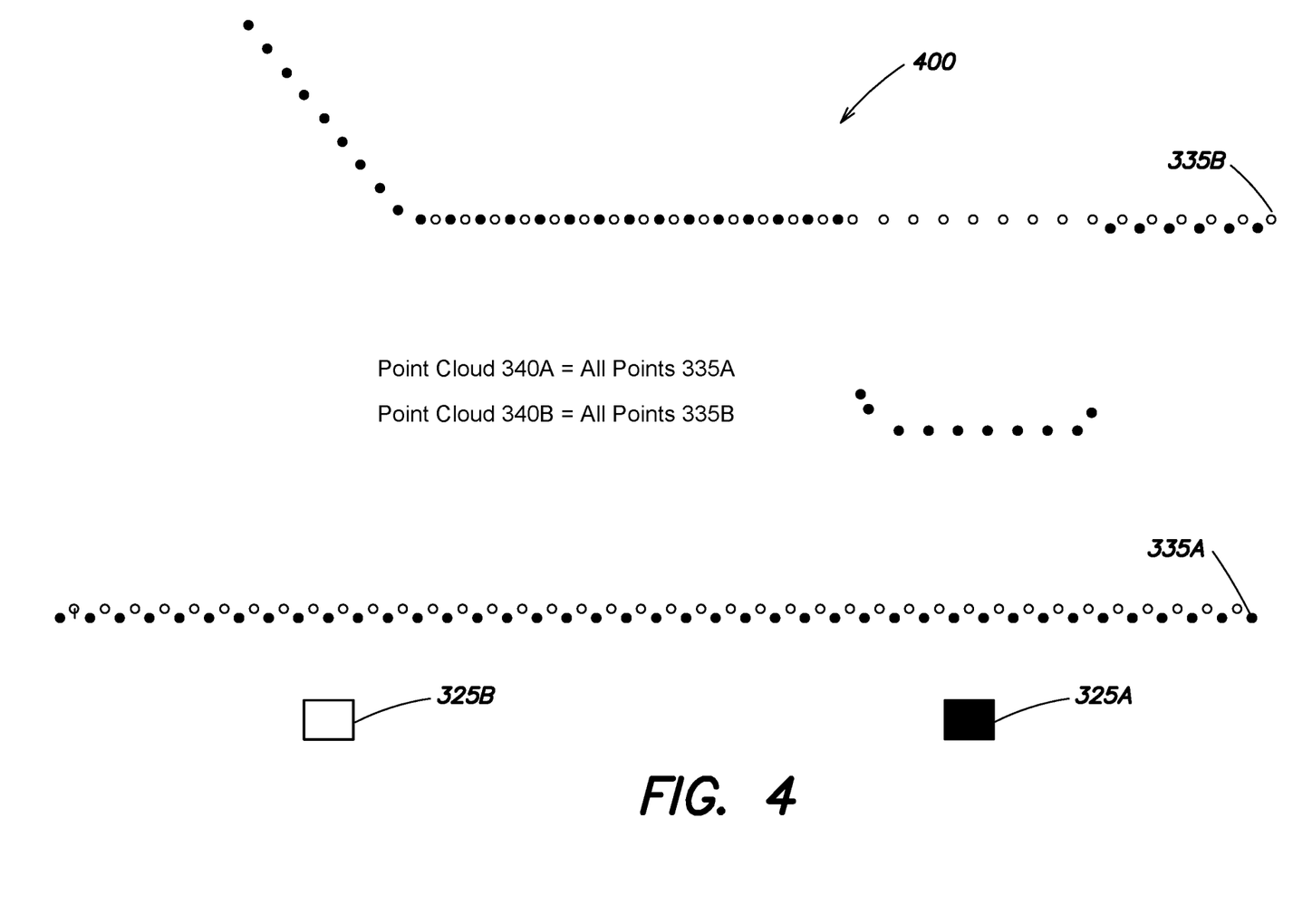
FIG. 4 is a diagram illustrating two-dimensional (2D) slice view of the two point clouds that are respectively captured by the scanners of FIGS. 3A and 3B according to the one or more embodiments described herein.

FIG. 4 is a diagram illustrating a 2D slice view 400 of point clouds 340A and 340B captured by scanners 305A and 305B according to the one or more embodiments described herein. Square 325A represents the position of scanner 305A in scene 300A of FIG. 3A. Each point 335A of the point cloud 340A captured by scanner 305A is represented as a solid dot in FIG. 4. The locations of points 335A in space represent the surfaces of the building 310, vehicle 315, and wired fence 320 in scene 300A. For simplicity, only one point 335A in FIG. 4 is provided a reference number of 335A. However, it is expressly contemplated that each of the points of point cloud 340A has reference number 335A. Additionally, the reference number 335A may be utilized herein to refer to a single point and/or multiple points of point cloud 340A.

Square 325B represents the position of scanner 305B in scene 300B. Each point 335B of the point cloud 340B captured by scanner 305B is represented as an empty dot in FIG. 4 to differentiate the points of point clouds 340A and 340B. The locations of points 335B in space represent the surfaces of the building 310 and wired fence 320. Because vehicle 315 moved out of scene 300B when scanner 305B captured point cloud 340B, there are no points 335B in FIG. 4 for the surface of the vehicle 315. For simplicity, only one point 335B in FIG. 4 is provided a reference number of 335B. However, it is expressly contemplated that each of the points of point cloud 340B has reference number 335B. Additionally, the reference number 335B may be utilized herein to refer to a single point and/or to multiple points of point cloud 340B.

The points 335A and points 335B at the top of FIG. 4 represent the surface of building 310 that is a permanent object without see-through characteristics. The points 335A in the middle of FIG. 4 represent the surface of the vehicle 315 that is an unwanted, e.g., moving, object. The points 335A and the points 335B at the bottom of FIG. 4 represent the surface of the wired fence 320 that is a permanent object with see-through characteristics.

As will be described in further detail below for point clouds 340A and 340B, the visibility module 118 can determine that the points 335A and 335B that represent the wired fence 320 are coherent with each other, and thus the visibility scores for these points should not be lowered. In an implementation, consistency/coherency of at least two points means that the at least two points are sufficiently close to each other, and thus the at least two points represent or likely represent the surface of the same object. Moreover, and as will be described in further detail below for point clouds 340A and 340B, the visibility module 118 can determine that points 335A that represent the vehicle 315 lack coherency with any points 335B of point cloud 340B. As such, the visibility score for points 335A that represent the vehicle 315 can potentially be lowered based on the visibility rays from scanner 305B.

Each point in a point cloud may be a 3D point in space. Each point may be represented in the point cloud by different information. Such different information representing a point may include, but is not limited to, a location (e.g., x, y, and z coordinates), a scale, an oriented normal, a visibility score, and an origin list. It is expressly contemplated that according to the one or more embodiments described herein, the one or more portions of the different information may be determined for the points of the point clouds before the application 125 receives the point clouds in step 210. For example, each of point clouds 340A and 340B may include the different information for each point when the application 125 receives point clouds 340A and 340B. Alternatively, the visibility module 118 may determine one or more portions of the different information after receiving the point clouds in step 210.

A scale may be computed for each point of the point clouds 340A and 340B. For example, a scale may be computed for a point of a point cloud based on a distance from the point to its Nth closest neighbor. The scale may represent a local size of the point, which may be based on the size of the point's local neighborhood. In addition, N may be selected as a design parameter and may be value such as, but not limited to, a number between 15 and 50. In an embodiment, N is 15. As such, and for a point, the distance may be computed from the point to its 15th closest neighbor. The scale may be computed for each point of the point cloud in a similar manner and according to one or more embodiments described herein. To remove outlier scale values from the scale values computed for the points of the point cloud, a non-linear normalization may be applied by setting the bottom c % scales to the $c^{th}$ percentile value and by setting the top c % scales to the 100-$c^{th}$ percentile value. In an embodiment, c may be 5. As such, the bottom 5% of the computed scale may be set to values to the $5^{th}$ percentile computed scale value, and the top 5% of the computed scale values may be set to the $95^{th}$ percentile computed scale value.

An oriented normal may be computed for each point of the point clouds 340A and 340B. To compute the oriented normal for each point, a non-oriented normal value may first be calculated for each point of the point cloud. For example, a known principal component analysis (PCA) algorithm with parameters, e.g., number of neighboring points, may be used to compute the non-oriented normal value for each point of the point cloud. The normal of each point may be oriented based on a dot product of the computed non-oriented normal value for the point and the direction from the point to the scanner position that captured the point. If the dot product is a positive value, then the orientation of the computed normal value is correct. However, if the dot product is a negative value, the visibility module 118 may invert the sign of computed normal value for the point.

A visibility score may be determined for each point of the point clouds 340A and 340B. The visibility score for a point may be based on the number of sources utilized to capture or generate the point cloud having the plurality of points. In an embodiment, a point is assigned a visibility score of 1 if the point cloud is captured from a scanner. When the point cloud is generated from images utilizing a plurality of cameras, each point in the point cloud may be assigned a visibility value that is equal to the number of cameras. In the example of FIGS. 3A and 3B, each point of point clouds 340A and 340B captured by scanners 305A and 305B is determined to have a visibility score of 1.

An origin list may be created for each point of the point 340A and 340B. In an implementation, the origin list includes a position of the source that generate the point and a unique identifier for the source. As such, and in the examples of FIG. 3A, each point of the point cloud 304A includes an origin list that includes the position of scanner 305A, e.g., represented by square 325A, and a unique identifier of scanner 305A. Similarly, and in the example of FIG. 3B, each point of point cloud 340B includes an origin list that includes the position of scanner 305B, e.g., represented by square 325B, and a unique identifier of scanner 305B. When the point cloud is generated from images utilizing a plurality of cameras, the origin list for a point will include a position of each of the plurality of cameras utilized to generate the point and the unique identifiers for each of the plurality of cameras.

The point clouds 340A and 340B, with the information representing each of points 335A and 335B, may respectively be transmitted from scanners 305A and 305B to application 125 over network 111. Alternatively, the point clouds 340A and 340B, with the information representing each of points 335A and 335B, may be stored in storage (e.g., solid-state drive (SSD), hard drive, etc.) and then transmitted to application 125.

Referring back to FIG. 2, the procedure continues to step 215 and the visibility module 118 creates a sample for each point of the plurality of point clouds. Continuing with the example, the visibility module 118 creates a sample for each of points 335A of point cloud 340A. Additionally, the visibility module 118 creates a sample for each of points 335B of point cloud 340B. In an implementation, the visibility module 118 creates a sample for a point by generating a sphere for the point utilizing the scale computed for the point and the oriented normal determined for the point.

As known by those skilled in the art, points of a point cloud are discreet information such that each point of the point cloud does not have a volume/area. Accordingly, the information associated with the points, e.g., x, y, and z coordinates, cannot be utilized to determine if a path between a point and a scanner is intersected by other points. To overcome this inherent deficiency associated with a point cloud, the visibility module 118, according to one or more embodiments described herein, may create a sphere for each point of the point clouds. By creating a sphere for each point, a coarse representation of the surface is created and the coarse representation, e.g., sphere, can be utilized to determine if the path between a point and a scanner is intersected by other points.

The size of a sphere for a point may be based on the computed scale for the point and the orientation of the sphere in space may be based on the computed oriented normal value for the point. For example, let it be assumed that a given point of a point cloud has its x, y, and z coordinates at 0, 0, 0 and the computed scale for the given point is a value of 2 cm. Therefore, the given point has its center at 0, 0, 0. The visibility module 118 may multiply the computed scale by a factor (f) to determine the radius of the sphere. In an embodiment, f can be any value. In an implementation, f is 3. As such, and in this example, the sphere for the given point has a radius of 6. The orientation of the sphere for the given point may be the computed oriented normal for the given point. The visibility module 118 may create a sample, e.g., sphere, for each of the points of point cloud 340A and 340B in a similar manner.

As described herein, the term sample and the term sphere may be used interchangeably. Further, and in an embodiment, the visibility module 118 may create a sample for a point as a different shaped object, e.g., square.

In an implementation, and optionally at step 215, the visibility module 118 may utilize the samples for each of the points to create an octree in any of a variety of different ways as known by those skilled in the art. In an embodiment, the octree may be created according to the FSSR algorithm. Instead of being created at step 215, it is expressly contemplated that the octree may be created at a different step of FIG. 2. The octree may be utilized by the algorithm, e.g., FSSR algorithm, to generate the model of the scene as will be described in further detail below with reference to step 245.

Referring to FIG. 2, the procedure continues to step 220 and the visibility module 118 inserts each sample (e.g., sphere), representing a different point of the plurality of point clouds, into a search structure that may be utilized for the efficient computation of the intersection of an input value with a set of objects. The search structure may be an Axis Aligned Bounding Box (AABB) tree that is utilized to determine an intersection of a path, a sample, a point, or any 3D primitive. In an embodiment, the AABB tree may be utilized to determine intersection of points and spheres and determine the intersection of visibility rays (i.e., paths) and spheres. In an implementation, a visibility ray is a path in space between a source, e.g., scanner, and a point generated by the source.

The procedure continues to step 225 and the visibility module 118 generates a coherent source set for each point of the plurality of point clouds. The coherent source set, i.e., coherency information, for a point includes those sources whose visibility rays should not be utilized to invalidate the point.

In an embodiment, each point of a point cloud that is generated by a scanner are coherent with all the other points generated by the same scanner. Specifically, and in an embodiment, a scanner may scan the scene by physically rotating in the scene to capture the points of the point cloud that represent the surfaces of the objects in the scene. The scanner may utilize visibility rays while spherically rotating to capture the points of the point cloud. Specifically, each visibility ray may be in a different direction such that the entire scene is captured during the spherical rotation of the scanner, where no single visibility ray has the same direction as any of the other visibility rays. Because two visibility rays from the same scanner can never overlap, a point (e.g., a sphere created for the point) generated from a scanner can never intersect a different visibility ray from the scanner. As such, a visibility ray from a scanner can never invalidate a point generated by the scanner. Therefore, a point of a point cloud is always consistent/coherent with all other points of the point cloud.

Accordingly, the visibility module 118 determines that the source that generates the points of a point cloud are always included in the coherent source set for each point of the point cloud. For example, the coherent source set for each of points 335A of point cloud 340A includes the unique identifier for scanner 305A. Similarly, the coherent source set for each of points 335B of point cloud 340B includes the unique identifier for scanner 305B.

The coherent source set for a point may also include a different source that generated a different point cloud. Specifically, the visibility module 118 may determine that a different source is included in the coherent source set for a point if the point is coherent with a different point generated by the different source. As previously mentioned, a point is consistent/coherent with a different point if the different point is sufficiently close, i.e., within a threshold distance, to the point. If the different point is sufficiently close to the point, the visibility module 118 determines that the different point and the point represent or likely represent the surface of the same object.

Therefore, the different point being sufficiently close to the point validates that the point represents or likely represents the surface of a permanent object in the scene. Stated another way, the different point being sufficiently close to the point indicates that the scanner that generated the point and the different scanner that generated the different point captured or likely captured the same object in the scene. Because two different scanners captured the same object in the scene, it is more likely that the object is a permanent object in the scene.

Therefore, the different point validates the authenticity of the point (e.g., that the point represents the surface of a permanent object). As such, the visibility module 118 determines that the visibility rays of the different scanner that generated the different point cannot invalidate the point. That is, because the different point validates the authenticity of the point as described above, it would be inconsistent to allow the visibility rays from the different scanner that generated the different point to also invalidate the point.

To determine if points are sufficiently close to each other, the visibility module 118 can utilize the samples that are created for the points as described in step 215. Referring back to FIG. 4 as an illustrative example, point cloud 340A includes points 335A and point cloud 340B includes points 335B. Each of points 335A and 335B has a corresponding sample s. For each s, the visibility module 118 may identify the list of different samples that contain the center of s.

In an implementation, the visibility module 118 may utilize the center of s to query the AABB tree to identify the list of different samples that contain the center of s. By utilizing the AABB tree to identify the list of different samples that contain the center of s, the one or more embodiments described herein conserve processing resources when compared to conventional brute-force techniques that compare the center of s with each sample to identify the list of different samples.

If a different sample contains the center of s, the visibility module 118 determines that the point corresponding to s is sufficiently close enough to the point corresponding to the different sample. Stated another way, if a different sample contains the center s, the visibility module 118 determines that the point corresponding to s is within a threshold distance of the point corresponding to the different sample. As such, the point corresponding to the different sample is coherent/consistent with the point corresponding to s. The visibility module 118 determines that the two points represent or likely represent the surface of the same object, e.g., permanent object, in the scene. As described herein, the threshold distance may be directly based on the radiuses of the created spheres. As indicated above, the radius of a sphere is based on a multiplication of a point's scale and f. Therefore, the threshold distance may be modified by altering the f.

Referring back to FIG. 4 as an illustrative example, points 335A generated by scanner 305A and representing the wired fence 320 are located at the bottom of FIG. 4. The visibility module 118 may determine that each sample, corresponding to each of points 335A representing the wired fence 320, contains the center of at least one sample that corresponds to a point 335B representing the wired fence 320. As such, the visibility module 118 may determine that at least one point 335B is sufficiently close to each of points 335A representing the wired fence 320. Therefore, each of points 335A representing the wired fence 320 is validated, by at least one point 335B, as representing a permanent object in the scene. Because each point 335A representing the wired fence is validated by at least one point 335B, the visibility module 118 determines that the visibility rays from scanner 305B cannot invalidate points 335A representing the wired fence 320. Thus, the visibility module 118 may update the coherent source set for each of points 335A representing the wired fence 320 to include the unique identifier of scanner 305B. Accordingly, the coherent source set for each point 335A representing the wired fence 320 includes the unique identifier of scanners 305A and 305B.

Similarly, the visibility module 118 may determine that each sample, corresponding to each of points 335B representing the wired fence 320, contains the center of at least one sample that corresponds to a point 335A representing the wired fence 320. As such, the visibility module 118 may determine that at least one point 335A is sufficiently close to each point 335B representing the wired fence 320. Therefore, each of points 335B representing the wired fence 320 is validated, by at least one point 335A, as representing a permanent object in the scene. Because each point 335B representing the wired fence is validated by at least one point 335A, the visibility module 118 determines that the visibility rays from scanner 305A cannot invalidate points 335B representing the wired fence 320A. Accordingly, the coherent source set for each point 335B that represents the wired fence 320 includes the unique identifier of scanners 305B and 305A.

The points 335A generated by scanner 305A and representing vehicle 305 are located in the middle of FIG. 4. The visibility module 118 may determine that the samples corresponding to these points do not contain a center of a sample corresponding to any points 335B generated by scanner 305B. As such, the visibility rays from scanner 305B can potentially invalidate points 335A generated by scanner 305A and that represent vehicle 315. Therefore, the points 335A representing the vehicle 315 include a coherent source set that includes only the unique identifier for scanner 305A.

The visibility module 118 may generate a coherent source set for each of points 335A and 335B in a similar manner.

Referring back to FIG. 2, the procedure continues to step 230 and the visibility module 118 creates a visibility ray for each sample. Specifically, the visibility module 118 creates a visibility ray between each source and each sample corresponding to a different point generated by the source. Continuing with the example, scanner 305A generates points 335A of point cloud 340A and scanner 305B generates points 335B of point cloud 340B. As such, the visibility module 118 creates a visibility ray between scanner 305A and each sample corresponding to a different point 335A of point cloud 340A. Similarly, the visibility module creates a visibility ray between scanner 305B and each sample corresponding to a different point 335B of point cloud 340B.

In an implementation, the visibility ray is a path between (1) the location of the scanner (e.g., x, y, and z coordinates) that generated a point and (2) a position (e.g., x, y, and z coordinates) at the edge of the sample that corresponds to the generated point. Ending the visibility ray at the end of the sample ensures that the filtering, according to the one or more embodiments described herein, is far enough away from the sample since local conflicts can be dealt with by the algorithm utilized to generate the model, e.g., a meshing algorithm. In an implementation, the visibility module 118 determines the position at the edge of the sample based on the path from the position of the scanner to the center of the sample.

In an implementation, the visibility module 118 may create the visibility ray for a sample as a segment. The segment may be a pair that includes (1) the position of the scanner that generated the point and (2) the position at the edge of the sample that corresponds to the generated point. That is, the segment represents the path in space of the visibility ray between the position at the edge of the sample (e.g., x, y, and z coordinates) and the scanner position (e.g., x, y, and z, coordinates).

The procedure continues to step 235 and the visibility module 118 identifies the samples, if any, that intersect each of the visibility rays. In an implementation, the visibility module 118 may query the search structure, e.g., AABB tree, utilizing a visibility ray (e.g., segment pair), to identify the samples, if any, that intersect the path between the scanner that generated the point and the edge of the sample that corresponds to the point. By utilizing the AAAB tree to identify intersecting samples, the one or more embodiments described herein conserve processing resources when compared to conventional brute-force techniques that compare the visibility ray (e.g., segment pair) to the position of each of the samples to identify intersecting samples.

Figure 5:
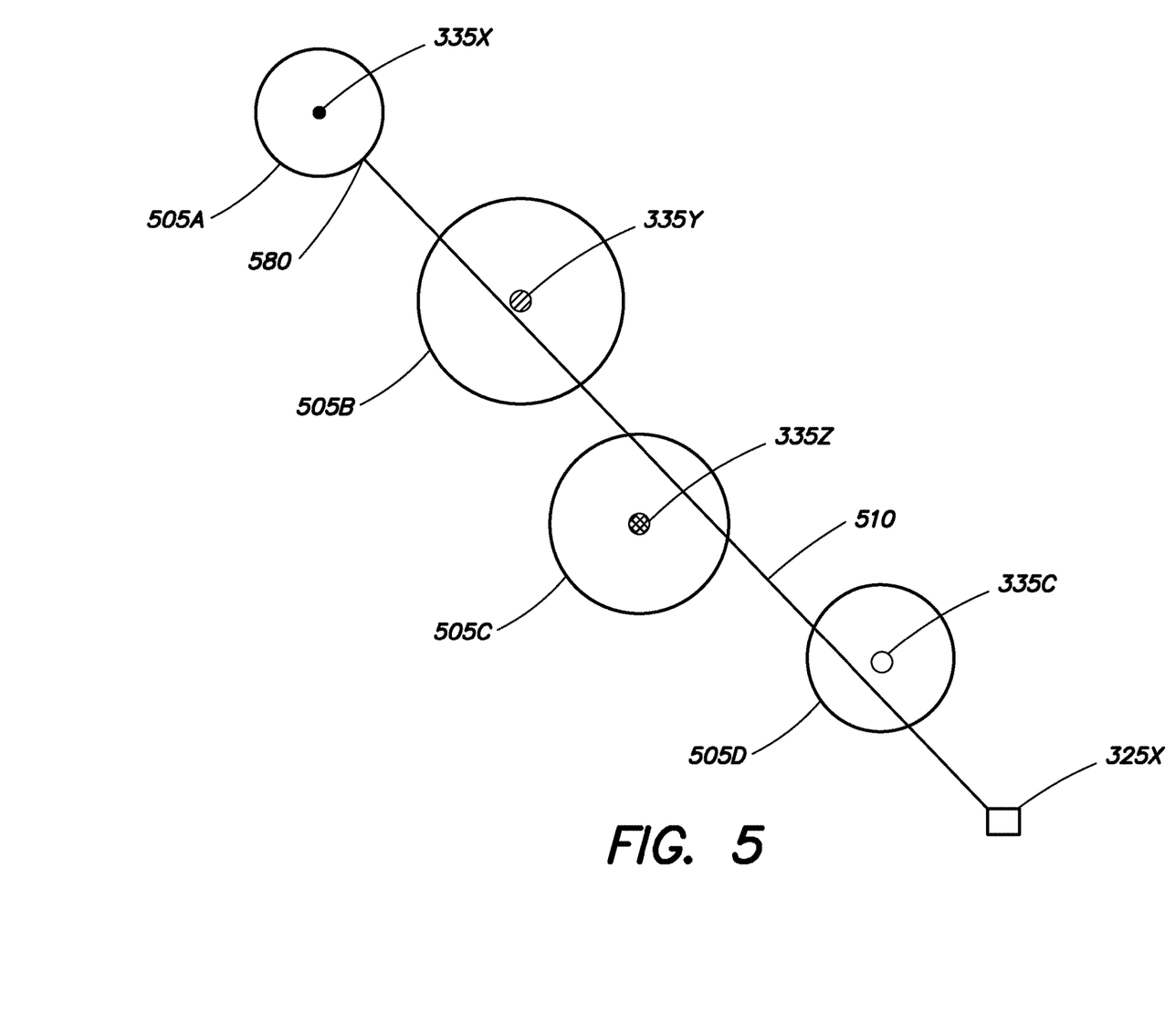
FIG. 5 is a diagram illustrating an example visibility ray that is intersected by a plurality of samples according to the one or more embodiments described herein.

FIG. 5 is a diagram illustrating an example visibility ray 510 that is intersected by a plurality of samples according to the one or more embodiments described herein. As depicted in FIG. 5, square 325X represents the position of a scanner (not shown) that captures point 335X of a point cloud (not shown). For simplicity and ease of understanding, the other points of the point cloud, captured by the scanner at the position represented by square 335X, are not shown in FIG. 5. As described above, a sample, e.g., sphere, for a point can be computed utilizing the scale and oriented normal computed for the point. As the orientation of a sample does not affect the identification of the intersection of a visibility ray, the orientations for the samples have not been included in FIG. 5.

The sample 505A for point 335X is computed utilizing the scale of point 335X that is located at the center of sample 505A. As further depicted in FIG. 5, visibility ray 510 extends between the position of the scanner, represented by square 325X, and a position at the edge 580 of sample 505A. The visibility module 118 may utilize the position of the scanner and the position at the edge 510 to query the AABB tree.

Based on the query, the visibility module 118 may determine that visibility ray 510 is intersected by samples 505B, 505C, and 505D as depicted in FIG. 5. Samples 505B, 505C, and 505D respectively correspond to points 335Y, 335Z, and 335C. In this example, points 335X, 335Y, 335Z, and 335C are respectively points of different point clouds. As such, points 335X, 335Y, 335Z, and 335C are depicted in FIG. 5 as dots with different highlighting (e.g., solid, empty, checkered lines, and diagonal lines).

Referring back to FIG. 4, the visibility module 118 can similarly utilize the visibility rays from scanners 305A and 305B to identify intersecting samples that correspond to different points 305A and 305B of point clouds 340A and 340B.

Referring back to FIG. 2, the procedure continues to step 240 and the visibility module 118 implements a filtering technique for each intersecting sample identified in step 235. In an implementation, the filtering technique includes determining if one or more conditions are met to lower or maintain the visibility score for the point corresponding to the intersecting sample.

For example, the visibility module 118 may implement the following conditional set for each intersecting sample:
1. IF the point corresponding to the intersecting sample has a visibility score of 0 or lower,
    a. THEN do not lower the visibility score of the point and keep the visibility score at 0 or lower;
2. IF the point corresponding to the intersecting sample has in its coherent source set the unique identifier of the scanner associated with the visibility ray,
    a. THEN do not lower the visibility score and keep the visibility score for the point at its current value;
3. IF the visibility ray intersects the intersecting sample at all points determined to be in front of the center of the intersecting sample;
    a. THEN do not lower the visibility score and keep the visibility score for the point at its current value;
4. ELSE reduce the visibility score by a particular value. In an implementation, the particular value can be any value. In an implementation, the particular value is 0.33.

The above conditional set only reduces the visibility score for a point generated by a scanner if a visibility ray from a different and non-coherent scanner intersects the sample, corresponding to the point, at one or two positions that are determined to be behind the center of the sample. The visibility module 118 may determine that a position is behind the center of the sample based on a plane defined by the oriented normal of the sphere. If a visibility ray of a different non-coherent source intersects a sample from behind at one or more locations, the visibility module 118 determines that the point corresponding to the sample should have been captured by the non-coherent scanner but was not. If the point should have been captured but was not, then the point corresponding to the sample might be an outlier, e.g., unwanted object, and the visibility score should be reduced. If a visibility ray of a different non-coherent source intersects a sample at both locations that are determined to be in front, the visibility module 118 determines that the visibility ray is passing through free space and not through a surface.

Figure 6:
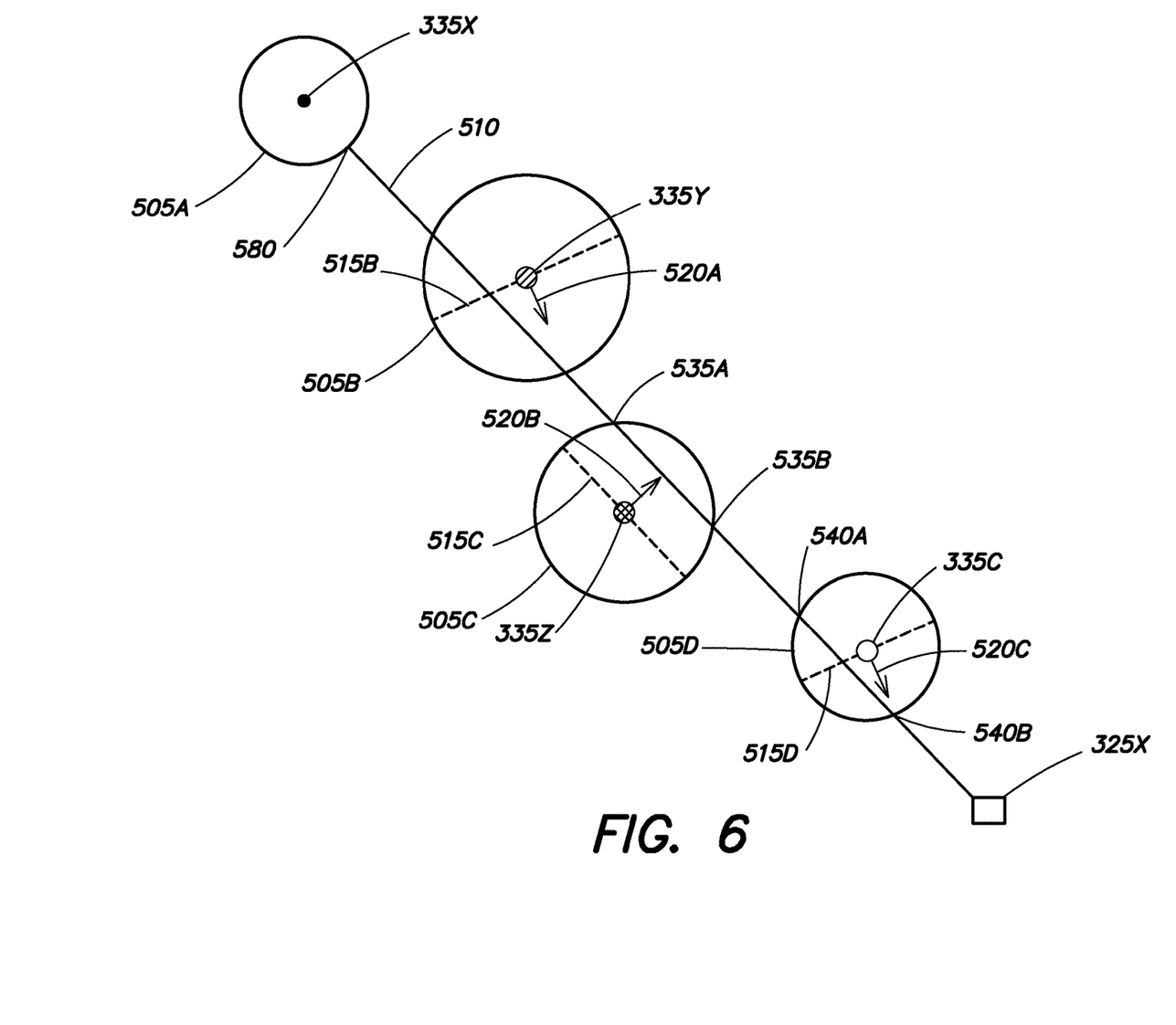
FIG. 6 is a diagram illustrating the implementation of a filtering technique based on the visibility ray and intersecting samples of FIG. 5 according to the one or more embodiments described herein.

FIG. 6 is a diagram illustrating the implementation of a filtering technique based on the visibility ray and intersecting samples of FIG. 5 according to the one or more embodiments described herein. As depicted in FIG. 6, each of intersecting samples 505B-505D include an oriented normal 520A-520C that can be computed as described above. In an embodiment, a plane for each sample may be defined as being the plane that is perpendicular to oriented normal for the sample at the center of the sample. The visibility module 118 may determine planes 515B-515D that are perpendicular to the oriented normals 520A-502C as depicted in FIG. 6.

In this example, let it be assumed that point 335Y, corresponding to sample 505B, is coherent with at least one other point (not shown) generated by the scanner that generated point 335X. As such, point 335Y has a coherent source set that includes a unique identifier for the scanner that generated point 335Y and a unique identifier for the scanner that generated point 335X. Accordingly, point 2 of the above conditional set is satisfied and the visibility score for point 335Y is maintained at its current value.

Let it be assumed that the coherent source set for point 335Z only includes the unique identifier for the scanner that generated point 335Z. In this example, visibility ray 510 intersects sample 505C at locations 535A and 535B in FIG. 6. Because the two locations are in front of plane 515C defined by the direction of the oriented normal 520B, the visibility module 118 determines that point 3 of the above conditional set is satisfied. As such, the visibility score for point 335Z is maintained at its current value.

Let it be assumed that the coherent source set for point 335C only includes the unique identifier for the scanner that generated point 335C. In this example, visibility ray 510 intersects sample 505C at locations 540A and 540B in FIG. 6. Because location 540A is behind the plane 515D defined by the direction of oriented normal 520C, the visibility module 118 determines that point 335C should have been captured by the scanner but was not. Thus, point 335C might be an outlier, e.g., a point representing an unwanted object. As such, the visibility module 118 determines that the visibility score for point 520C should be lowered. For example, if point 335C has a visibility score of 1, the visibility score may be lowered to 0.67, e.g., 1-0.33. Alternatively, if the point 335C has a visibility score of 0.33 because the visibility score had been lowered by other visibility rays associated with other scanners, the visibility module 118 would lower the visibility score for point 335C to a value of 0, e.g., 0.33-.0.33. In an implementation, and if the visibility score for a point becomes a value that is less than 0, the visibility module 118 may adjust that visibility score to 0.

Figure 7:
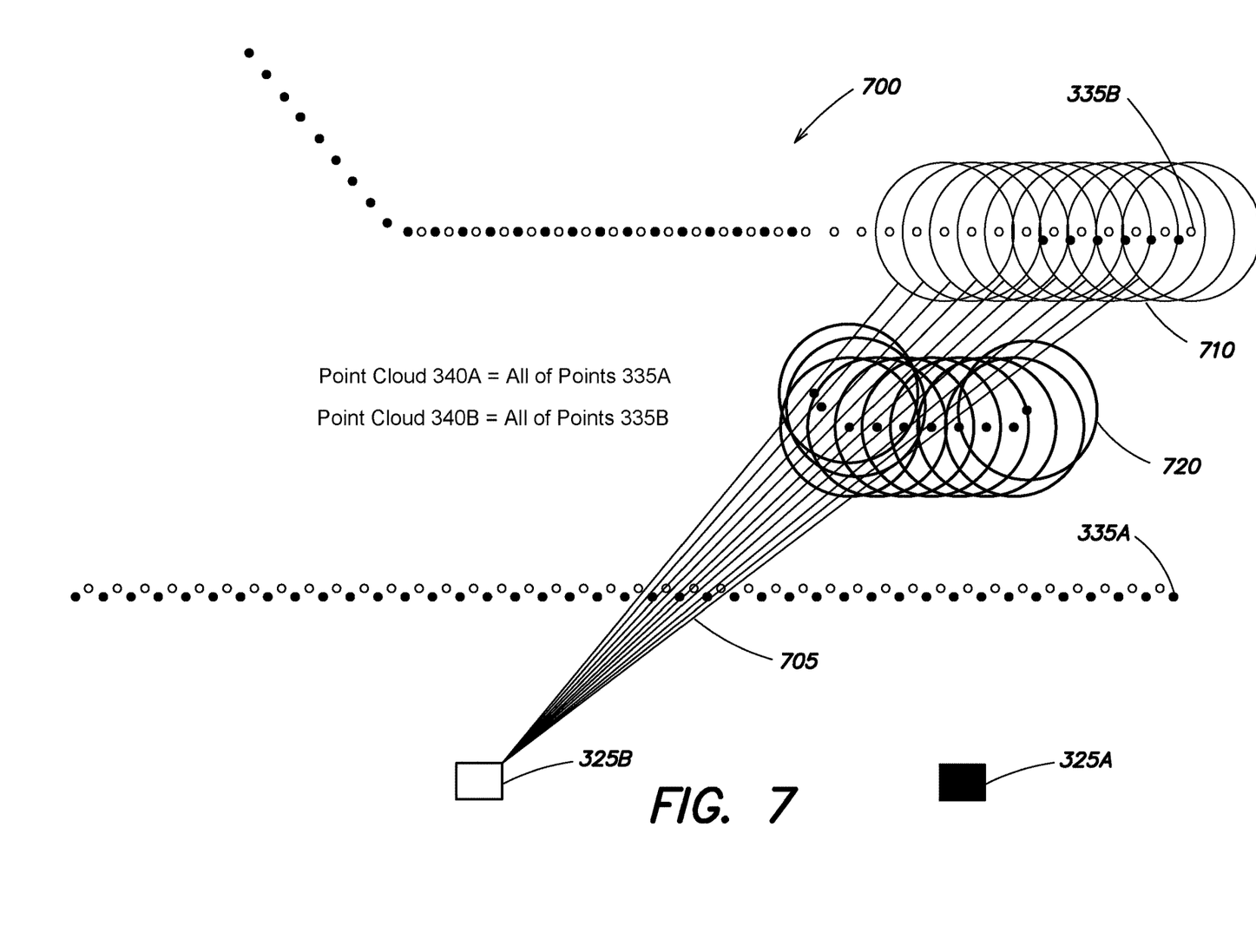
FIG. 7 is a diagram illustrating a 2D slice view for invalidating points of a point cloud that represent the vehicle, an unwanted object, in the scene of FIG. 3A according to the one or more embodiments described herein.

FIG. 7 is a diagram illustrating a 2D slice view 700 for invalidating points 335A of point cloud 340A that represent the vehicle 315 in scene 300A according to the one or more embodiments described herein. As depicted in FIG. 7, scanner 305B, which is at a position represented by square box 325B in FIG. 7, includes a plurality of visibility rays 705. Visibility rays 705 extend between the position of scanner 305B and samples 710 that correspond to points 335B that represent the surface of building 305. The plurality of visibility rays 705 are intersected by samples 720 that correspond to points 335A that are generated by scanner 305A and that represent the surface of the vehicle 315. Specifically, and as depicted in FIG. 7, samples 720 are intersected by visibility rays 705 at one or more locations behind the centers of samples 720. Accordingly, the visibility module 1178 may lower the visibility scores for each of points 335A representing vehicle 315 based on visibility rays 705 and the conditional set as described above.

Further, it should be noted that the visibility rays (not shown) from scanner 305A that is represented by square box 325A will not invalidate (1) points 335B that represent the top left portion of the building 305, and (2) points 335B that represent the portion of the building 305 that is above the points 335A that represent the vehicle 315. These points 335B will not be invalidated by the visibility rays (not shown) of scanner 305A because the visibility rays (not shown) will not intersect the samples that correspond to these points.

Referring back to FIG. 2, the procedure continues to step 245 and the model generator module 119 utilizes a point cloud and its visibility scores with a model generation algorithm to generate a model of the scene. In an implementation, the model generation algorithm is a floating scale surface reconstruction (FSSR) algorithm. As previously described, the samples for the points of the point cloud may be utilized to create an octree. As known by those skilled in the art, the FSSR algorithm may compute a score (herein referred to as an FSSR score) for each sample that intersects a summit of the octree.

According to the one or more embodiments described herein, the FSSR score for each intersecting sample may be multiplied by its corresponding visibility score. If, for example, the visibility score is 0, the FSSR score for the intersecting sample will also be 0. As such, the FSSR score for the intersecting sample will be 0 and the intersecting sample will not be utilized in the construction of the model of the scene. If the visibility score is not 0, the FSSR score for the intersecting sample will be modified based on the visibility score. In an embodiment, the visibility score represents the confidence that the point corresponding to a sample represents a permanent object in the scene. Specifically, the confidence that a point represents a permanent object increases as the visibility score increases. Advantageously, and according to the one or more embodiments as described herein, the confidence that a point represents a permanent object is accounted for by multiplying the visibility score determined for the point, according to the one or more embodiments described herein, with an intersecting sample that corresponds to the point. Advantageously, points that are determined to represent unwanted objects with a visibility score of 0 are not utilized by the model generator module 119 in generating a model of a scene.

A summit score may be generated for each summit of the octree based on a summation of the FSSR scores for the intersecting samples that intersected the summit. The model generator module 119 may execute a Marching Cube algorithm that utilizes the summit scores for the octree in a conventional manner to generate the model of the scene.

Referring back to example FIGS. 3A, 3B, and 7, the model generator module 119 may generate a model of scene 300A utilizing the point cloud 340A that includes points 335A and the visibility scores for the points 335A. In this example, let it be assumed that the visibility score for each point 335A that represent vehicle 315 is a value of 0 based on the invalidation of these points by visibility rays 705 in FIG. 7 as described above. Additionally, let it be assumed that the visibility score for each of the other points 335A that represent the building 310 and wire fence 320 with see-through characteristics has a visibility score of 1. For example, the points 335A that represent the wired fence 320 with see-through characteristics are not invalidated because of their coherency with points 335B of point cloud 340B that represent the wired fence 320.

The model generator module 119 may execute the FSSR utilizing the visibility scores for points 335A. Specifically, the model generator module 119 may multiple the FSSR score of each sample that intersects a summit of the created octree with the visibility score for the point 335A that corresponds to the intersecting sample. As such, the intersecting samples that correspond to the points 335A that represent the vehicle 315 have an FSSR score of 0. Conversely, the intersecting samples that correspond to the points 335A that represent the building 305 and wired fence 320 will have an FSSR score that is equal to its FSSR before the multiplication with the visibility score, since the visibility score for these points are a value of 1.

The model generator module 119 may then generate a summit score for each summit of the octree based on a summation of FSSR scores of the intersecting samples that intersect the summit. Therefore, an FSSR score of 0 ensures that the intersecting sample that intersected a summit does not affect the summit score for the summit. As such, and in this example, the summit score for each summit of the octree is not affected by the intersecting samples that correspond to points 335A that represent the vehicle 315A. Conversely, the summit scores for each summit of the octree is affected or influenced by the intersecting samples that corresponds to points 335A that represent the building 305 and wired fence 320.

The model generator module 119 may utilize the summit scores for the octree to generate a model of the scene 300A. As such, the model generated includes visual representations of the building 305 and wired fence 320 with see-through characteristics. However, the model generated of the scene does not include vehicle 315 that is an unwanted, e.g., moving, object.

Because the model generated from point cloud 340A does not include a visual representation of an unwanted object, e.g., vehicle 305, but does include a visual representation of a permanent object with see-through characteristics, e.g., wired fence 320, the one or more embodiments provide an improvement over conventional model generation techniques that may, for example, destroy or in accurately depict the visual representation of the wired fence in the generated model. Therefore, the one or more embodiments described herein provide an improvement in the existing technological field of computer model generation by generating a computer model (3D model) from a point cloud that accurately depicts the scene.

It should be understood that a wide variety of adaptations and modifications may be made to the techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A system comprising:
a processor coupled to a memory, the processor configured to:
generate (1) a first sample for each of a plurality of first points of a first point cloud generated by one or more first sources and (2) a second sample for each of a plurality of second points of a second point cloud generated by one or more second sources, wherein each first point and each second point has a visibility value;
create a visibility ray between (1) each first point and the one or more first sources to generate a plurality of first visibility rays and (2) each second point and the one or more second sources to generate a plurality of second visibility rays;
identify one or more selected second samples that intersect one or more of the first visibility rays, wherein the one or more selected second samples correspond to one or more selected second points;
adjust the visibility value for a particular second point, of the one or more selected second points, when each of the plurality of first points of the first point cloud is not within a threshold distance of the particular second point of the second point cloud; and
maintain the visibility value for the particular second point, of the one or more selected second points, at a current value when at least one first point, of the plurality of first point of the first point cloud, is within the threshold distance of the particular second point of the second point cloud, wherein the visibility value is utilized to differentiate between an unwanted physical with object and a permanent physical object.

2. The system of claim 1, wherein the one or more first sources is a single Light Detection and Ranging (LiDAR) scanner.

3. The system of claim 1, wherein the one or more first sources is a plurality of cameras.

4. The system of claim 1, wherein
the first point cloud is for a first scene and the plurality of first points represents surfaces of one or more first objects in the first scene,
the second point cloud is for a second scene and the plurality of second points represent surfaces of one or more second objects in the second scene, and
the first scene and the second scene overlap.

5. The system of claim 4, wherein the one or more second objects in the second scene includes an unwanted object, and wherein the unwanted object is not included in the one or more first objects in the first scene.

6. The system of claim 5, wherein the processor is further configured to:
generate a model of a second scene utilizing the second point cloud and the visibility score for each of the plurality of second points with a model generation algorithm, wherein the generated model does not include a visual representation of the unwanted object.

7. The system of claim 4, wherein
the one or more second objects in the second scene includes an unwanted object and an object with see-through characteristics,
the unwanted object is not included in the one or more first objects in the first scene, and
the object with see-through characteristics is included in the one or more first objects in the first scene.

8. The system of claim 7, wherein the processor is further configured to:
generate a model of the second scene utilizing the second point cloud and the visibility score for each of the plurality of second points with a model generation algorithm, wherein the generated model does not include a visual representation of the unwanted object and includes a visual representation of at least the object with see-through characteristics.

9. The system of claim 8, wherein the model generation algorithm is floating scale surface reconstruction (FSSR) algorithm.

10. A method, comprising:
generating (1) a first sample for each of a plurality of first points of a first point cloud generated by one or more first sources and (2) a second sample for each of a plurality of second points of a second point cloud generated by one or more second sources, wherein each first point and each second point has a visibility value;

creating a visibility ray between (1) each first point and the one or more first sources to generate a plurality of first visibility rays and (2) each second point and the one or more second sources to generate a plurality of second visibility rays;

identify one or more selected second samples that intersect one or more of the first visibility rays, wherein the one or more selected second samples correspond to one or more selected second points;

adjusting the visibility value for a particular second point, of the one or more selected second points, when each of the plurality of first points of the first point cloud is not within a threshold distance of the particular second point of the second point cloud; and maintaining the visibility value for the particular second point, of the one or more selected second points, at a current value when at least one first point, of the plurality of first point of the first point cloud, is within the threshold distance of the particular second point of the second point cloud, wherein the visibility value is utilized to differentiate between an unwanted physical with object and a permanent physical object.

11. The method of claim 10, wherein the one or more first sources is a single Light Detection and Ranging (LiDAR) scanner or a plurality of cameras.

12. The method of claim 11, wherein
the first point cloud is for a first scene and the plurality of first points represents surfaces of one or more first objects in the first scene,
the second point cloud is for a second scene and the plurality of second points represent surfaces of one or more second objects in the second scene, and
the first scene and the second scene overlap.

13. The method of claim 12, wherein
the one or more second objects in the second scene includes an unwanted object and an object with see-through characteristics,
the unwanted object is not included in the one or more first objects in the first scene, and
the object with see-through characteristics is included in the one or more first objects in the first scene.

14. The method of claim 13, further comprising:
generating a model of the second scene utilizing the second point cloud and the visibility score for each of the plurality of second points with a model generation algorithm, wherein the generated model does not include a visual representation of the unwanted object and includes a visual representation of at least the object with see-through characteristics.

15. The method of claim 14, wherein the model generation algorithm is floating scale surface reconstruction (FSSR) algorithm.

16. The method of claim 10, further comprising:
utilizing an Axis Aligned Bounding Box (AAB) tree to identify the one or more selected second samples that intersect the one or more of the first visibility rays.

17. A non-transitory computer readable medium having software encoded thereon, the software when executed by one or more computing devices operable to:
for a first point cloud that includes a plurality of first points and a second point cloud that includes a plurality of second points, wherein
the first point cloud is generated by a first source and the second point cloud is generated by a second source,
each of the plurality of first points has a visibility value;
identify each intersecting first point, of the plurality of first points, that intersect a path in space between the second source and each of the plurality of second points;
lower the visibility value for each intersecting first point in response to determining (1) that the path in space between the second source and a particular second point is behind the intersecting first point at one or more locations, and (2) each of the plurality of second points is not within a threshold distance of each intersecting first point, wherein the visibility value is utilized to differentiate between an unwanted physical with object in a scene and a permanent physical object in the scene; and
utilize the first point cloud with the visibility values for each of the first plurality of points to generate a model of the scene represented by the first point cloud.

18. The non-transitory computer readable medium of claim 17, wherein the first source is a single Light Detection and Ranging (LiDAR) scanner or a plurality of cameras.

19. The non-transitory computer readable medium of claim 17, wherein the model is generated utilizing a floating scale surface reconstruction (FSSR) algorithm.

20. The non-transitory computer readable medium of claim 17, wherein the first point cloud includes points representing an unwanted object and the model does not include a visual representation of the unwanted object.

21. The system of claim 1, wherein the visibility value for a particular point is utilized to determine if the particular point corresponds to an unwanted object in a scene.

* * * * *

UNITED STATES PATENT AND TRADEMARK OFFICE
CERTIFICATE OF CORRECTION

PATENT NO. : 12,299,815 B2
APPLICATION NO. : 17/982798
DATED : May 13, 2025
INVENTOR(S) : Cyril Novel et al.

It is certified that error appears in the above-identified patent and that said Letters Patent is hereby corrected as shown below:

In the Claims

Claim 1:
Column 18, Line 17 reads:
"unwanted physical with object and a permanent"
Should read:
"unwanted physical object and a permanent"

Claim 10:
Column 19, Line 23 reads:
"between and unwanted physical with object and a permanent"
Should read:
"between and unwanted physical object and a permanent"

Claim 17:
Column 20, Line 30 reads:
"differentiate between an unwanted physical with object"
Should read:
"differentiate between an unwanted physical object"

Signed and Sealed this
Fifth Day of August, 2025

Coke Morgan Stewart
*Acting Director of the United States Patent and Trademark Office*